V. H. HALLOCK.
Method of and Means for Cooling and Drying while Reducing Grain into Flour.
No. 224,823.  Patented Feb. 24, 1880.
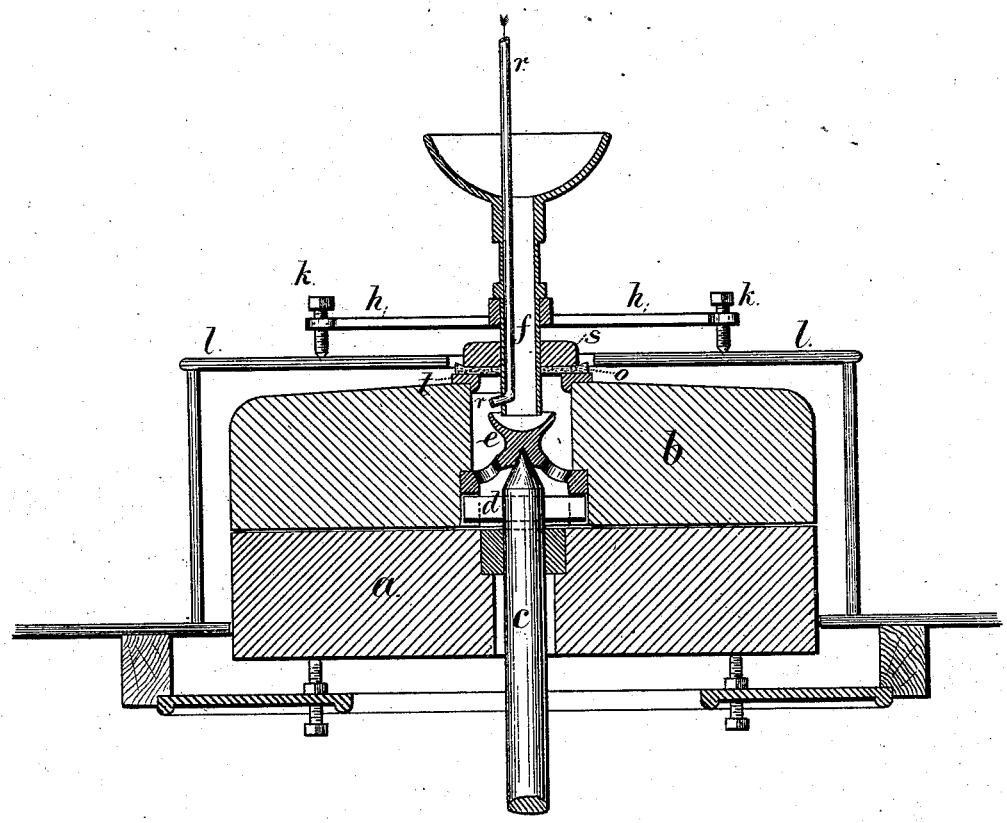
Witnesses.
Chas. H. Smith
Harold Perrell
Inventor
Valentine H. Hallock
per Lemuel W. Perrell
atty.

UNITED STATES PATENT OFFICE.

VALENTINE H. HALLOCK, OF QUEENS, NEW YORK.

METHOD OF AND MEANS FOR COOLING AND DRYING WHILE REDUCING GRAIN INTO FLOUR.

SPECIFICATION forming part of Letters Patent No. 224,823, dated February 24, 1880.

Application filed September 1, 1879.

*To all whom it may concern:*

Be it known that I, VALENTINE H. HALLOCK, of Queens, in the county of Queens and State of New York, have invented an Improvement in the Method of Grinding and Cooling Flour, of which the following is a specification.

It is well known to millers that the friction in grinding flour causes the generation of heat, that renders the flour adhesive, causing it to fill up the millstone-dress and to adhere to the bolts, and preventing the separation of the flour from the bran. The frictional heat also tends to make active any moisture in the grain, and thereby increase its adhesiveness. The heating of the grain renders it necessary to use extensive coolers, and often flour is injured or rendered sour by the action of the heat and moisture before it becomes dry and cool.

In some instances the millstones have been ventilated by a current of air passed into the millstone-eye. This, however, is not efficient in keeping the flour cool.

It is well known that air, when compressed, gives out its heat and moisture, and that when allowed to expand it refrigerates and dries substances with which it comes into contact.

My improvement consists in the method of cooling and drying flour while being ground, consisting in compressing air into a pipe, exposing such pipe to the cooling action of water or other material to cool the same and condense any moisture from the air, conveying the air under pressure directly into the eye of the stone, and allowing the air to escape in a small jet among the grain as it is ground in such a manner as to perform two duties: first, to keep the stones cold, and, second, to abstract the moisture from the flour, at the same time that any increase in its temperature is prevented. By this improvement the stones are kept in much better condition than heretofore, the flour is not heated, and the coolers are either dispensed with or only small coolers required.

The air made use of is to be compressed, as the circumstances may require, to forty to eighty pounds to the square inch by suitable air-pumps, and conveyed in pipes through water or otherwise to reduce the temperature to that of the ordinary atmosphere, and moisture that condenses in consequence of the increased pressure is received into a trap or vessel and drawn off. The compressed air is now in a condition to be taken in pipes to the various mills in the establishment, and a small jet of such air passes into the space between the stones.

In the drawing I have shown by a vertical section a mill adapted to this method of grinding.

The bed-stone $a$, runner $b$, spindle $c$, and driver $d$ are of any usual or desired character.

At the upper end of the bail there is a cup, $e$, into which the grain passes from the vertical tube $f$, and the same is thrown off by centrifugal force, and it is known as a "silent feed." The tube $f$ is raised or lowered to regulate the feed. It is supported by the arms $h$, at the ends of which are adjusting-screws $k$, resting upon the curb $l$.

Upon the upper part of the runner there is a collar, $t$, that partially closes the millstone-eye, and the washer $o$, that fits tightly around the feed-tube $f$, rests upon this collar, and is kept to the same by the weight $s$, so that there may be a small atmospheric pressure within the eye, sufficient to force its way through between the grinding-surfaces, and thereby cause the air to pass off with the flour. At the same time the runner is allowed the freedom of movement necessary for it to act properly in grinding, and a vibrating movement is not given to the feed-tube.

The atmosphere, under the required pressure, is supplied into the millstone-eye by any suitable pipe. I have shown pipe $r$ as passing down the feed-tube $f$ and terminating in a lateral nozzle, made changeable, and of a size sufficient to cause a jet of air to issue into the eye and to pass between the stones. I find it necessary to vary the pressure according to the temperature and conditions of the weather and grain. By refrigerating the air I dry the grain and flour and cool the same and the stones, and I avoid the difficulties heretofore arising from the use of a great quantity of air passing between the stones.

The air being under a heavy pressure, expands as it passes into the eye, and hence it acts to refrigerate the stones and the grain and prevent the same becoming heated, and at the same time the moisture of the grain is taken up by the very dry cold air, and the flour is delivered in a perfect condition without injury, and cool and dry, or nearly so. Hence the drying and cooling devices generally used to act upon the flour of the grinding may be partially or entirely dispensed with. The washer *o* acts as a valve, and rises in case the pressure within the eye is too great, so as to allow the escape of air; and the pressure upon the washer to keep it down may be varied to regulate the pressure within the eye.

I am aware that air under pressure has been passed into a vessel for the equalization of its pressure before it enters into the millstone-eye, and I am also aware that a collar has been provided above the millstone to retain the air in the eye; but in this instance the air entered the stones in a large volume and blew the grain and flour through between the stones, and there was no refrigerating action. In my device the pressure of the air is maintained until it escapes through the small nozzle into the millstone-eye, where its expansion produces a refrigeration and cools the grain, flour, and stones.

I claim as my invention—

1. The method specified of cooling and drying flour while being ground, consisting in compressing air into a pipe, exposing such pipe to the action of water to cool the same and condense any moisture from the air, conveying the air under pressure directly into the eye of the stone, and allowing the air to escape in a small jet among the grain as it is ground, to cool the same and abstract moisture, substantially as set forth.

2. The combination, with a millstone, feeding-tube, and collar to close the eye, of a pipe conveying air under pressure directly into the millstone-eye, and having a jet-opening for the escape of the air, whereby the grain, flour, and stones are cooled by the refrigerating action of the expanded air.

Signed by me this 27th day of August, A. D. 1879.

VALENTINE H. HALLOCK.

Witnesses:
WILLIAM G. MOTT,
HAROLD SERRELL.